July 17, 1962
K. W. TANTLINGER
3,044,653
TARPAULIN ROOF CONSTRUCTION FOR OPEN TOP FREIGHT CONTAINERS
Filed Dec. 1, 1958
5 Sheets-Sheet 2
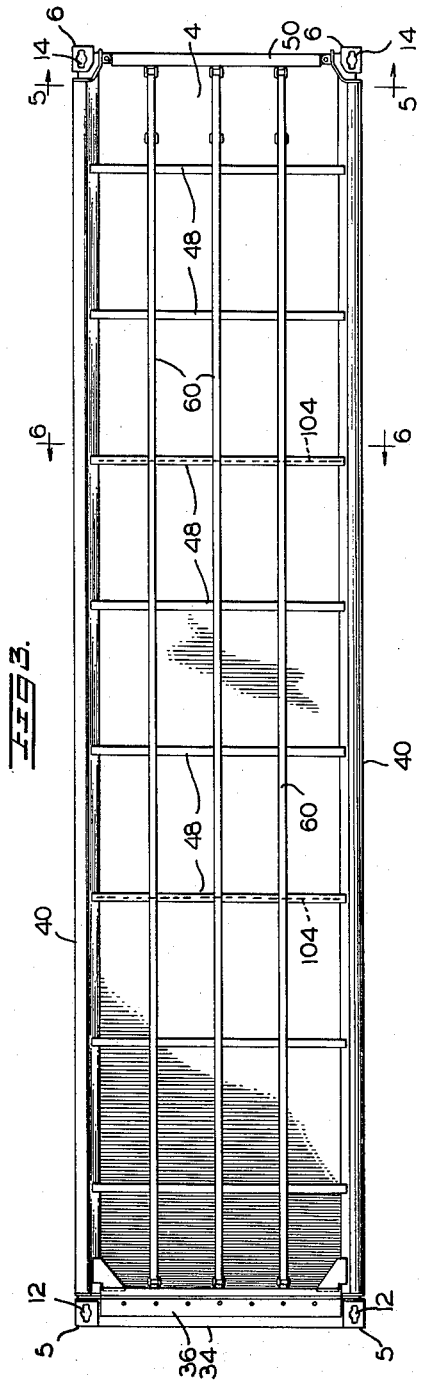
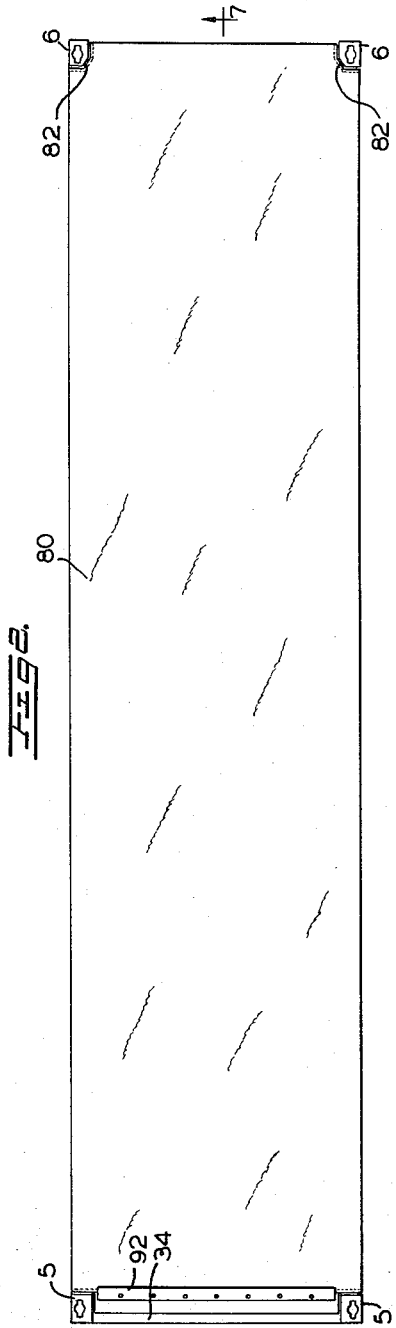
INVENTOR
Keith W. Tantlinger
BY Robert H. Kirchner
ATTORNEY July 17, 1962
K. W. TANTLINGER
3,044,653
TARPAULIN ROOF CONSTRUCTION FOR OPEN
TOP FREIGHT CONTAINERS
Filed Dec. 1, 1958
5 Sheets-Sheet 3
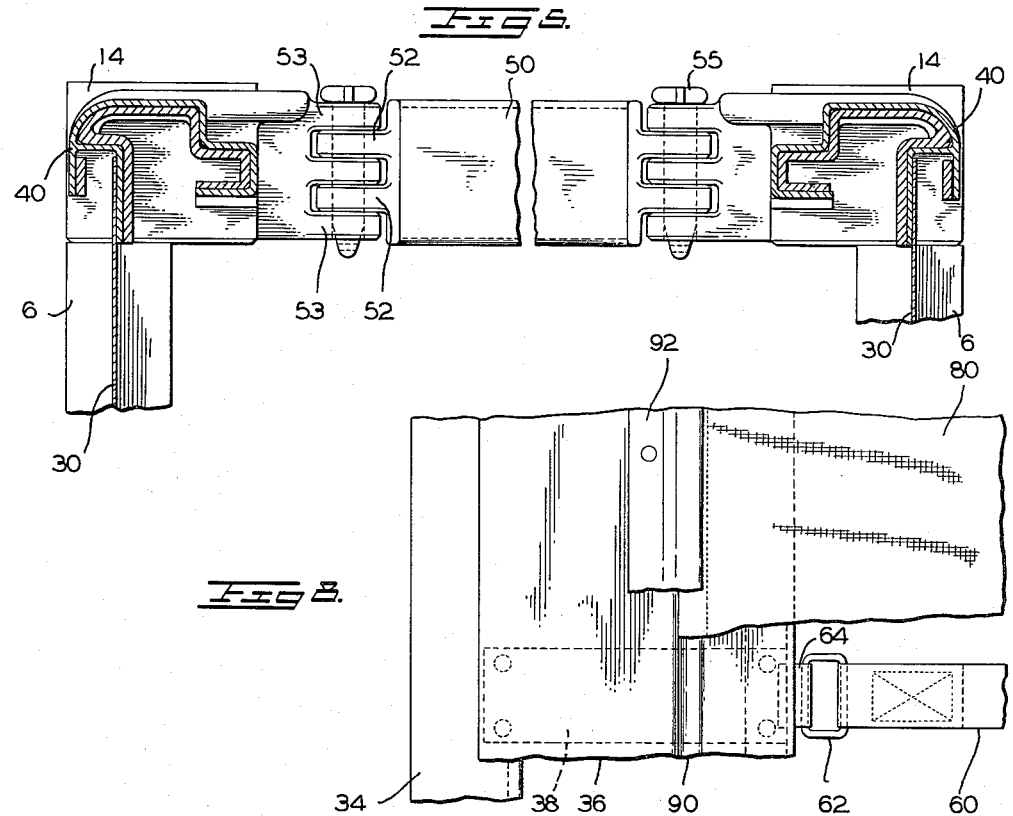
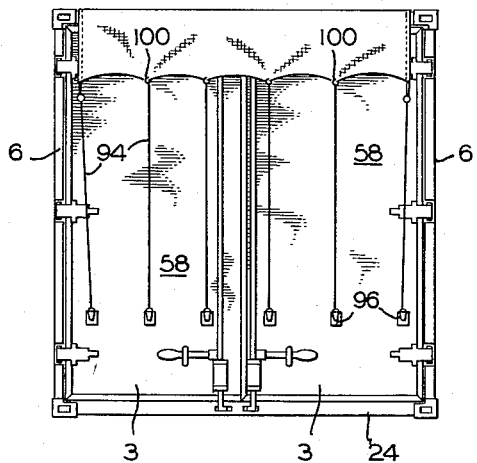
INVENTOR.
Keith W. Tantlinger
BY Albert H. Kirchner
ATTORNEY

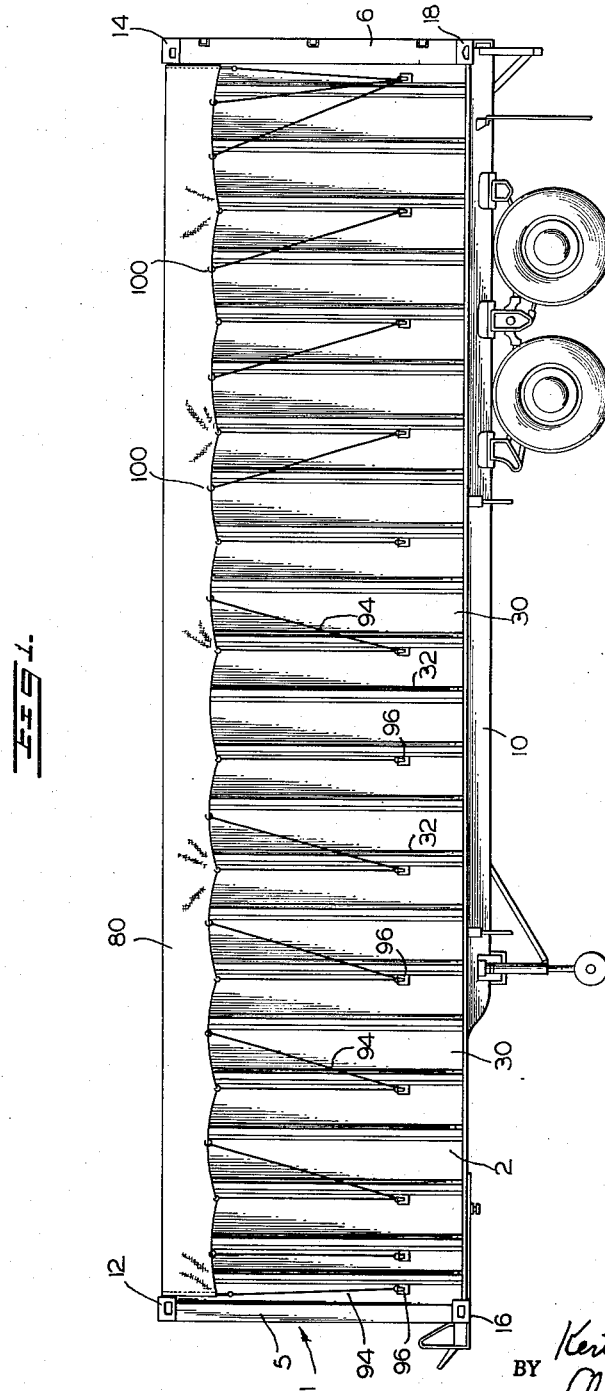

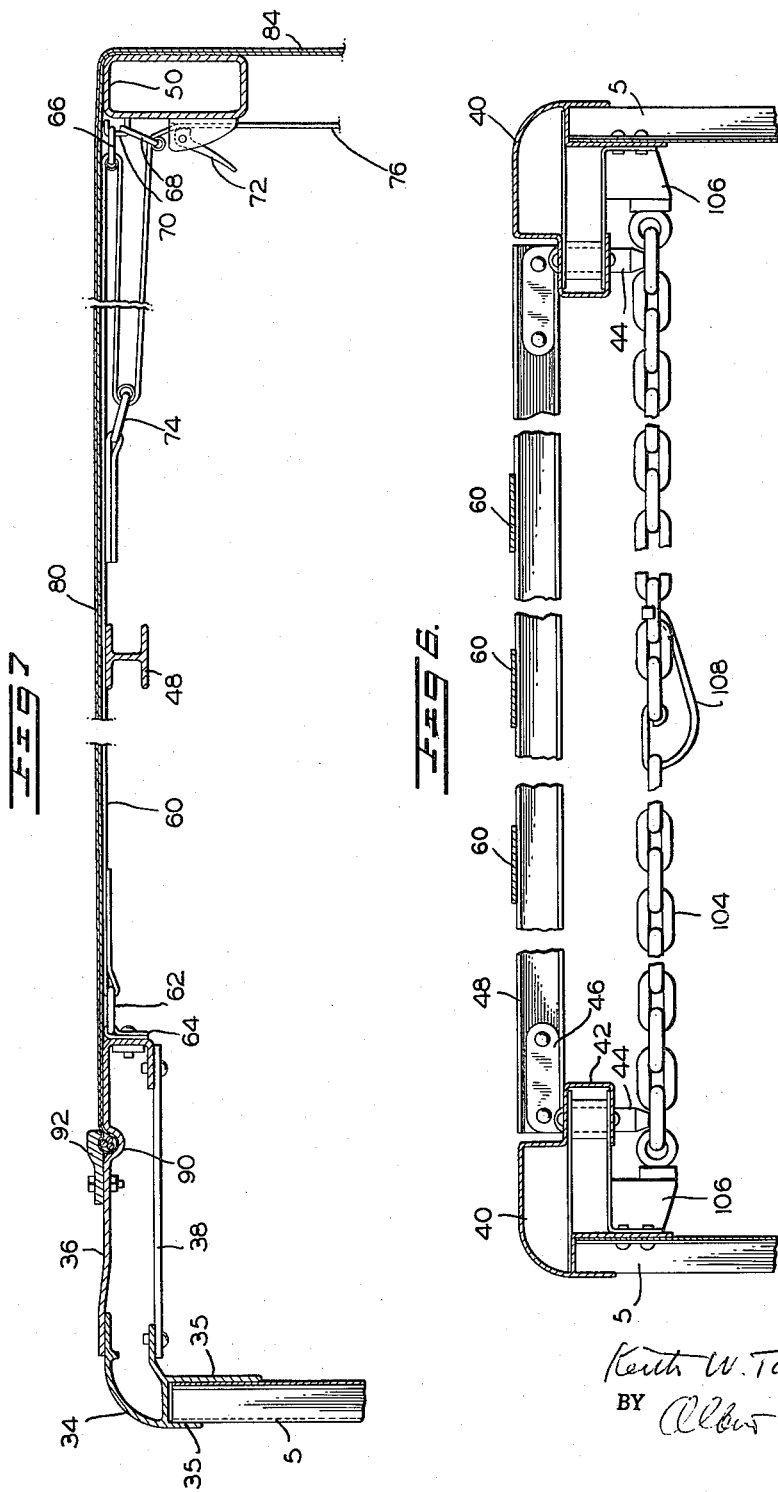

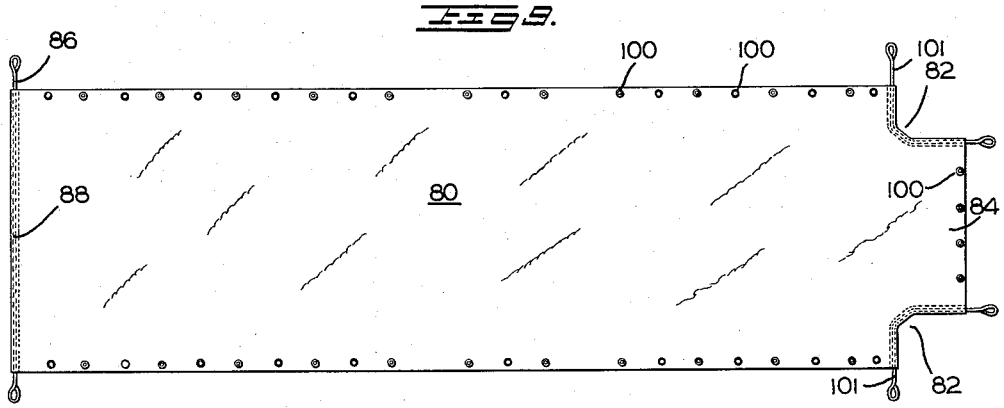
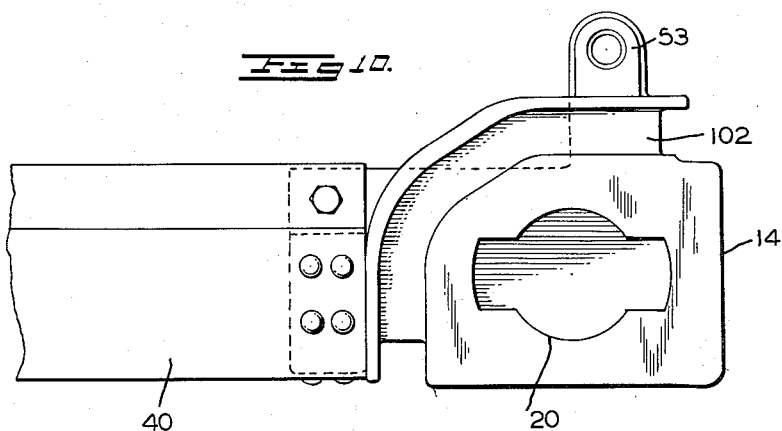
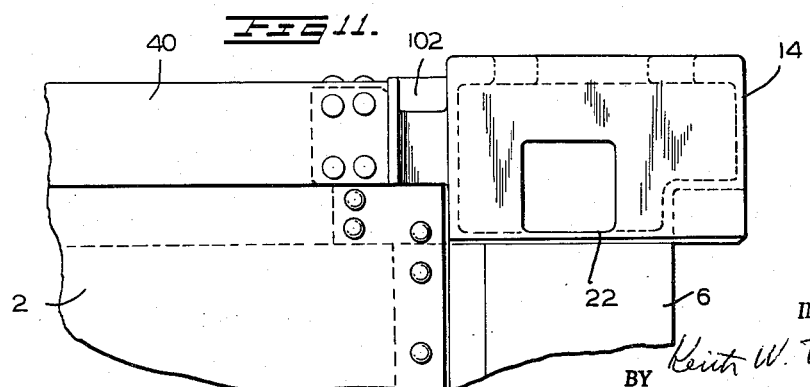

United States Patent Office 3,044,653
Patented July 17, 1962

3,044,653
TARPAULIN ROOF CONSTRUCTION FOR OPEN TOP FREIGHT CONTAINERS
Keith W. Tantlinger, Grosse Pointe Shores, Mich., assignor to Sea-Land Service, Inc., a corporation of Delaware
Filed Dec. 1, 1958, Ser. No. 777,361
13 Claims. (Cl. 220—1.5)

The present invention relates to a generally open top container for freight and a tarpaulin cover therefor, and more particularly it provides a land transportation vehicle body, adapted to be mounted on a highway truck trailer chassis, railway flat car or the like, and to be detached therefrom and stowed in or on a ship for marine transportation, of the general type disclosed and claimed in my several copending applications including Serial No. 682,512, Marine Freight Handling Apparatus, filed September 6, 1957, Serial No. 727,165, Apparatus for Handling Freight in Transit, filed April 8, 1958, now Patent No. 3,027,025, and Serial No. 763,739, Shipboard Freight Container Transferring Apparatus, filed September 26, 1958.

The container disclosed and claimed in those applications, for transfer between shipboard and land vehicle for movement in transport successively by land and water, is illustrated as a highway truck trailer type body having a hard top fixed roof with loading and unloading doorways in a vertical wall, specifically in the rear end wall. Such containers are adequate for many types of lading, but will not accommodate certain large, bulky or unwieldy cargo which because of their size, weight or for other reasons cannot be fitted through vertical wall doorways and/or cannot be moved horizontally along the floor of the container even if it be possible to pass them through the doorway. Large pieces of electrical equipment, such as transformers, and various kinds of agricultural and other machinery, military armament, vehicles, small boats, etc., are examples of such freight.

The present invention provides a container of open top construction equipped with a tarpaulin cover which can be removed so that cargo of the kind indicated can be admitted by lowering it down by conventional crane or other hoisting equipment and which can thereafter be replaced in weathertight covering relationship.

An object of the invention is to provide a container body capable of having substantially its entire floor area uncovered to receive cargo and of thereafter being closed by application of a flexible sheet material cover.

A particular object is to provide a container body of the tarpaulin roof type capable of being handled in the manner shown in the copending applications hereinabove identified, i.e., capable of being hoisted between a land vehicle and a marine vessel and of being stacked in engaged, superposed relation one on another in the ship's hold or on the deck.

Other objects are concerned with providing a covered container of the class described which will be rugged and durable in use, easy to handle in applying and removing the cover, and inexpensive to manufacture.

Further objects and advantages will be apparent to those skilled in the art from the following description of a specific embodiment of the inventive principles that will thereafter be pointed out in the claims.

In the accompanying drawings which form part of this application for letters patent and which illustrate the presently preferred embodiment of the invention, FIGURE 1 is a side elevational view of a highway truck trailer body mounted on a conventional type chassis;

FIG. 2 is a top plan view of the trailer body shown in FIG. 1;

FIG. 3 is a similar view with the cover removed;
FIG. 4 is a rear end elevational view;
FIG. 5 is a vertical transverse cross sectional view on a relatively enlarged scale taken along the line 5—5 of FIG. 3;
FIG. 6 is a similar view taken along the line 6—6 of FIG. 3;
FIG. 7 is a vertical longitudinal cross sectional view taken along the line 7—7 of FIG. 2;
FIG. 8 is a fragmentary detail plan view, with portions broken away, of the front edge anchorage of the tarpaulin top;
FIG. 9 is a top plan view of the tarpaulin top;
FIG. 10 is a top plan view of the rear end corner post and adjacent side plate structure shown in the lower right hand corner of FIG. 3; and
FIG. 11 is a side elevational view of the upper portion of the rear end corner post shown in FIG. 10, with a portion of the adjacent side wall structure.

In these figures the reference numeral 1 designates generally the container body, here shown as comprising basically a pair of side walls 2, a rear end wall constituted principally by a pair of hinged, outwardly opening doors 3, and a front end wall, all surmounting a floor 4 and disposed in oblong arrangement between a pair of front corner posts 5 and a pair of rear corner posts 6. In general, this is the construction disclosed in my copending applications hereinabove identified, as is also the truck trailer chassis 10 on which the container body is shown mounted in FIG. 1 and from which it is detachable for hoisting onto a marine vessel where it is stacked in a column of superposed similar bodies in the ship's hold or mounted on the deck or on a hatch cover, where it may be similarly mounted on or under another identical body.

In order to support the full weight of a superposed body and transmit that load to the support beneath (which may be another container body), the corner posts 5 and 6 are of special construction as disclosed in the copending applications. Briefly stated, for the purposes of the present application, each of these posts is formed of heavy gauge steel of adequate strength and has welded to its upper end a casting which projects above the level of all the rest of the structure and is provided with means adapted to be engaged in grappling connection by a hoisting device for lifting and lowering the container body between shipboard and shore areas. In the drawings the reference numeral 12 designates the front corner post top castings, and 14 designates the castings surmounting the rear corner posts.

Generally similar heavy castings are welded to the bottoms of the corner posts, as shown at 16 at the front and 18 at the rear. These bottom castings extend to a horizontal plane lower than any other part of the construction, so that they and they alone will make contact with the top castings of a subjacent body in a stack, and they are shaped and formed to make interfitting engagement with coupling means for securing the body in place. A convenient means for effecting this coupling is to socket the bottom castings with a type of keyhole aperture for penetration by a rotatable pin or post having laterally projecting lugs.

The top castings 12 and 14 are similarly provided with keyhole type sockets, as shown in FIGS. 2 and 3, from which, in combination with FIG. 11, it will be noted that each of the four top castings is formed with an upper flat surface having a keyhole socket 20 and a side drain flat opening 22, both communicating with the generally hollow interior of the casting.

The four corner posts are connected at their bottoms by end and side sills, typified by the rear end sill 24, and the side and front walls of the body are formed by sheet metal panels 30 stiffened by ribs 32, as is usual in these constructions.

The two front corner posts have their tops connected by a front top rail 34 which, as is best shown in FIG. 7, is suitably formed to fit on top of the posts and is provided with spaced apart inner and outer downturned skirts 35 to trim the upper margins of the front wall paneling. This front top rail has its rear edge connected by bolts or otherwise to a short rearwardly extending permanent or fixed roof section 36 which is made of flat sheet steel or aluminum stiffened by an inner edge flange which is bracketed to the rail by a number of laterally spaced braces 38, as shown in FIGS. 7 and 8.

The front and rear corner posts at each side of the container body are connected by a side top rail 40 which, like the front top rail 34, is formed at its ends to fit the castings surmounting the corner posts and has depending spaced skirts for trimming the top margins of the wall panels. The top rails 40 extend inwardly toward each other and at intervals along their length are provided with brackets 42 each of which is riveted in place and projects inwardly beyond the edge of the rail and is perforated to receive the pin 44 of a fitting 46 fixed in the end of a flat, straight roof bow 48, all as best shown in FIG. 6.

The container body is provided with a number of these roof bow elements, e.g., eight in the illustrated embodiment of the invention, all equally spaced along the length of the body, and each consisting of a length of light but rigid metallic I-beam as shown in FIGS. 6 and 7.

The two rear corner posts have their tops connected by a removable rear top rail 50 which, as shown in FIG. 5, comprises a beam of suitable length and stiffening cross section which terminates at each end in a pair of vertically aligned spaced lugs 52 which are perforated and interfit with three similar perforated lugs 53 projecting inwardly from the top casting 14 of the adjacent rear corner post 6. A headed pin 55 penetrating the aligned perforations of the two sets of lugs serves to hold each end of the rear top rail 50 in connecting relation to the two rear corner posts.

Rear doors formed of metal panels 58 may be hinged to the two rear corner posts to cooperate with the end sill and the top rail to complete the rear wall of the container body.

The rear top rail 50, front top rail 34, fixed roof section 36, and two side top rails 40 cooperate to form a rectangular opening which is approximately equal to the floor area of the container body. Through this opening may be inserted, by lowering from above, substantially any large bulky cargo that is capable of fitting on the floor area. If desired, the rear top rail 50 may be removed and the doors 3 opened so that the cargo may be swung into place through the thus completely opened rear wall.

With the cargo loaded on the floor and the rear top rail replaced, the roof bows 48 are installed by setting their end pins 44 into the brackets 42. This provides support at longitudinally spaced intervals for a set of straps or strap elements which cooperate with the roof bows to constitute a flat skeletonized foundation for the removable tarpaulin cover, all as will now be described.

The straps, designated 60 and shown as three in number, extend longitudinally of the top opening of the container body and are spaced equidistantly across the width of the opening, as best shown in the plan view of FIG. 3. Each comprises a strip of strong woven webbing of nylon or the like and has its front end permanently anchored to the fixed roof section 36 as by means of an oblong metal loop 62 secured in a fold sewed in the end of the strap and engaged in a clip 64 bolted to the forward edge flange of the fixed roof section, at the end of each of the braces 38, as shown in FIG. 7. Each of the strap elements 60 extends rearwardly, overlying the bow elements 48, and has its rear end adjustably secured to the removable rear top rail 50 by means providing for tightly tensioning the strap.

The tensioning and securing arrangement is important and the specific form which is preferred and shown in the drawings is believed to be novel and inventive. It comprises, for each strap element, an upper loop or eye 66 and a lower one 68, both engaged with the same loop or eye 70 instanding from the upper inner surface of the rear top rail directly above a clamping type buckle 72 which is also fixed on the rail. To the underside of the strap element, several feet short of the rear top rail, is sewed a loop 74 which is like the eyes 66 and 68. Each of the three loops may have mounted on its outstanding or extended bight a tubular sleeve for rotation antifrictionally on the loop to facilitate engagement by and reduce wear of a run of the strap element which is threaded successively through the loops 66, 74 and 68 and thence into engagement with the buckle 72, as shown in FIG. 7.

It will be evident that with the arrangement just described the free end portion 76 of each strap element can be pulled down to tighten the strap and that a very considerable tension can be introduced into the strap by such a pull because the doubled runs of strap between the loops 66 and 68 and the loop 74 results in applying to the run of strap between the fixed anchorage 62 and the loop 66 a force in tension which is double that with which the end 76 is pulled. If the buckle 72 be the self-setting clamping kind, as is preferred and as is shown in FIG. 7, the strap is tightened in place by simply pulling it through the buckle and releasing it to be clamped by the serrated roller end of the buckle lever.

The series of longitudinal straps 60 and transverse bows 48 constitute a flat skeletonized foundation for supporting a tarpaulin sheet 80 which covers the entire top opening of the container body.

This tarpaulin cover is preferably a single sheet of waterproof woven fabric, such as strong, treated nylon or the like, which is cut to the shape shown in FIG. 9. The shape is generally rectangular, of somewhat greater width than that of the container body opening and with the rear corners of the cover cut out as shown at 82 so that the cover terminates at its rear end in a slightly narrowed flap 84.

The front end of the cover is hemmed around a rope 86 to form an edge bead 88 which is clamped in a groove 90 formed in the top surface of the fixed roof section 36 by a clip 92 which is similarly grooved and is bolted down on the section, as best shown in FIGS. 7 and 2. The ends of the rope 86 protrude from the bead 88 and may be looped to receive tie ropes 94 which are secured to hooks 96 fixed to the lower zone of the side walls 2.

With the front end of the tarpaulin 80 thus permanently secured to the front of the container body top, and with the bow and strap elements 48 and 60 in operative position, the container body is covered by pulling the tarpaulin back over the bow and strap elements until the flap 84 hangs down over the rear top rail 50, with the corner cutouts 82 clearing the two rear end post top fittings 14 and both side margins of the cover extending over the side top rails 40 and down in lapping relation with the upper zones of the container body side walls 2, as shown in FIGS. 1 and 4. As also shown in these figures, and by FIG. 9, the two side margins and the rear end margin of the cover are lined with a series of grommets 100, in to which tie ropes 94 are knotted, with their lower ends secured to hooks 96 affixed to the side walls 2 and the rear doors 58, and the cutouts 82 are hemmed with ropes 101, like the rope 86 to which tie ropes 94 are knotted for connection to hooks 96. The covering is thus complete and is readily removed by simply unhooking the ropes 94 and rolling the tarpaulin forwardly onto or over the fixed roof section 36, after which the straps may be released and thrown forward, followed by removal of the bows 48 and, if desired, by removal of the rear top rail 50 also, for loading or unloading cargo.

The tarpaulin constitutes a completely weatherproof cover fully closing the whole opening of the container body while leaving exposed the four corner post top fittings 12 and 14. The front fittings 12 are exposed because they are located forward of the front edge of the tarpaulin, and the rear fittings are exposed through the cutout corners 82 of the cover. The parts are all constructed and arranged so that the top surfaces of all four fittings are co-planar at a level somewhat above that of the tarpaulin and all other elements of the combination. Thus the fittings provide bearings for a superposed container body whose lower fittings 16, 18 it will be remembered project below the level of the floor of the body and present co-planar bottom faces lower than any other parts of the structure.

Weatherproofing at each of the rear corners of the cover is effected by turning the edge margins of the tarpaulin, in each cutout 82, down into a shallow gutter or moat 102 formed in the fitting 14, as best shown in FIGS. 10 and 11.

For several reasons it may be desirable to stretch a chain, like that shown at 104 in FIG. 6, between fixed anchorages 106 formed on or adjacent to some of the bow-securing brackets 42. In the illustrated embodiment of the invention two such chains are shown, mounted equidistantly apart along the length of the container body, and each of them consists of two half-lengths of chain connected by a tensioning buckle element 108. In the form shown, this buckle includes a camming lever which has one end pivoted to the end link of one of the chain halves so that its other end can be inserted through the end link of the other chain half and then be swung to closed position with its free end hooked back over the first chain half. The effect is to tension the chain into pulling the two side walls 2 of the container body into accurately predetermined spacing, so that the bow element pins 44 may readily be aligned with and enter the holes in the brackets 42. Alternatively, the bows may be left off under some unusual circumstances, as where high projecting cargo makes it impossible to install the cover 60, in which case the chains, or some of them, may be used to stay the side walls against outward bulging.

It is to be understood that the precise mechanical design and construction as hereinabove described and as illustrated in the accompanying drawings need not be used in order to accomplish the objects of the invention, nor need all the details of the preferred complete embodiment of the invention be employed. On the contrary, the illustrated combination of parts and features may be altered and modified in respect of various components without departing from the spirit of the invention or the scope and purview of the broader of the appended claims.

I claim:

1. A transportable container body comprising four corner posts, front and rear top rails and side and end walls cooperating with said corner posts to provide a generally open-topped oblong enclosure, a plurality of rigid flat bow members extending transversely of the container and having downturned terminal extensions removably connected to the tops of the side walls for detachably connecting the members to the side walls, a plurality of flexible strap elements overlying the bow members and supported thereon and being unconnected thereto and each having one end anchored to the front top rail and having its opposite end detachably connected to the rear top rail to cooperate with the bow members to provide a skeletonized flat support, a tarpaulin cover mounted on said support and having its side margins lapping the side walls and at least one of its end margins lapping one of the end walls of the container body and having said margins secured to said respective lapped walls, and means surmounting each corner post and projecting above the level of the tarpaulin cover for effecting connection with the grappling element of a hoist for lifting the container body.

2. The combination claimed in claim 1 in which the tarpaulin cover is of generally oblong shape with certain of its corner areas removed to pass the means surmounting the adjacent corner post.

3. The combination claimed in claim 1 in which the tarpaulin cover is of generally oblong shape with the two corner areas adjacent the rear corner posts removed to pass the means surmounting said posts.

4. The combination claimed in claim 1 in which the upper portions of the side walls are connected by flexible tensioning means including a take up device for fixing said upper portions at a predetermined spacing.

5. A transportable container body comprising four corner posts each terminating at its top and bottom in a flat horizontal bearing surface, front and rear top rails and side and end walls cooperating with said corner posts to provide a generally open-topped oblong enclosure, a plurality of rigid flat bow members extending transversely of the container and provided with terminal hook portions removably received in socket openings formed on the side walls for detachably connecting the members thereto, a plurality of flexible strap elements overlying the bow members and supported thereon and being unconnected thereto and each having one end anchored to the front top rail and having its opposite end detachably connected to the rear top rail to cooperate with the bow members to provide a skeletonized flat support, and a tarpaulin cover mounted on said support and having its side and end margins lapping the side and end walls of the container body and secured thereto, said top bearing surface of each of the corner posts lying in a horizontal plane above the level of the tarpaulin cover for engaging and supporting a superposed similar container body.

6. The combination claimed in claim 5 in which the top bearing surface of each of the corner posts is provided with means for effecting connection with the grappling element of a hoist for lifting the container body.

7. The combination claimed in claim 5 in which the top bearing surface of each of the corner posts is socketed for penetration by and coupling to the grappling element of a hoist for lifting the container body.

8. The combination claimed in claim 5 in which the bottom bearing surface of each of the corner posts lies in a horizontal plane lower than that of any other portion of the container body whereby said surfaces of one container body are adapted to engage and bear on the top bearing surfaces of the corner posts of another container body stacked therewith.

9. A transportable container body comprising four corner posts, front and rear top rails and side and end walls cooperating with said corner posts to provide a generally open-topped oblong enclosure, a header surmounting each of said side walls and having a plurality of open sockets, a plurality of flat bow members connecting the tops of the side walls and extending transversely of the container and each provided with terminal downwardly projecting pins removably fitted into said sockets, a plurality of flexible strap elements overlying the bow members and each having one end anchored to the front top rail and having its opposite end detachably connected to the rear top rail to cooperate with the bow members to provide a skeletonized flat support, a tarpaulin cover mounted on said support and having its side margins lapping the side walls and at least one of its end margins lapping one of the end walls of the container body and having said margins secured to said respective lapped walls, and means surmounting each corner post and projecting above the level of the tarpaulin cover for effecting connection with the grappling element of a hoist for lifting the container body.

10. A transportable container body comprising four corner posts, front and rear top rails and side and end walls cooperating with said corner posts to provide a generally open-topped oblong enclosure, a header surmounting each of said side walls and having a plurality of upwardly open sockets, a plurality of flat bow members connecting the tops of the side walls and extending transversely of the container and each provided with terminal downwardly projecting pins removably fitted into said sockets, a plurality of flexible strap elements overlying the bow members and each having one end anchored to the front top rail and having its opposite end detachably connected to the rear top rail to cooperate with the bow members to provide a skeletonized flat support, a tarpaulin cover mounted on said support and having its side margins lapping the side walls and at least one of its end margins lapping one of the end walls of the container body and having said margins secured to said respective lapped walls, means surmounting each corner post and projecting above the level of the tarpaulin cover for effecting connection with the grappling element of a hoist for lifting the container body, and flexible tensioning means connecting the upper portions of the side walls including a take up device for fixing said upper portions at a predetermined spacing at which the pins at opposite ends of each bow member will register with sockets opposite each other on the two side walls.

11. A transportable container body comprising four corner posts, side and end walls cooperating with said corner posts to provide a generally open-topped oblong enclosure, a plurality of flat bow members connecting the tops of the side walls and extending transversely of the container, a plurality of flexible strap elements overlying the bow members and each having one end anchored to the top of an end wall and having its opposite end detachably connected to the top of the opposite end wall to cooperate with the bow members to provide a skeletonized flat support, said detachable connection comprising an eye fixed to the underside of the strap element inwardly from said second named end wall and a pair of eyes mounted on said second named end wall with the strap element laced through one of said end wall eyes, then through said strap element eye and then through the other of said end wall eyes, in combination with means fixing the end of the strap element to the second named end wall below the eyes thereof, a tarpaulin cover mounted on said skeletonized support and having its side margins lapping the side walls and at least one of its end margins lapping one of the end walls of the container body and having said margins secured to said respective lapped walls, and means surmounting each corner post and projecting above the level of the tarpaulin cover for effecting connection with the grappling element of a hoist for lifting the container body.

12. A transportable container body comprising four corner posts, side and end walls cooperating with said corner posts to provide a generally open-topped oblong enclosure, a plurality of flat bow members connecting the tops of the side walls and extending transversely of the container, a plurality of flexible strap elements overlying the bow members and each having one end anchored to the top of an end wall and having its opposite end detachably connected to the top of the opposite end wall to cooperate with the bow members to provide a skeletonized flat support, said detachable connection comprising disposing the portion of the strap element adjacent to said second named end wall in a plurality of runs looped back and forth between an eye on the element and eyes on said second named end wall, whereby the terminal end portion of the strap element may be fixed to the second named end wall after being pulled to stretch the element through said loops and introduce tension into the element, a tarpaulin cover mounted on said support and having its side margins lapping the side walls and at least one of its end margins lapping one of the end walls of the container body and having said margins secured to said respective lapped walls, and means surmounting each corner post and projecting above the level of the tarpaulin cover for effecting connection with the grappling element of a hoist for lifting the container body.

13. A transportable container body comprising four corner posts, front and rear top rails and side and end walls cooperating with said corner posts to provide a generally open-topped oblong enclosure, a header surmounting each of said side walls and having a plurality of upwardly open sockets, a plurality of rigid flat bow members connecting the tops of the side walls and extending transversely of the container and each provided with terminal downwardly projecting pins removably fitted into said sockets, a plurality of flexible strap elements resting on the bow members and unconnected therewith and each having one end anchored to the front top rail and having its opposite end detachably connected to the rear top rail to cooperate with the bow members to provide a skeletonized flat support which can be readily removed by disconnecting the strap elements from the second named end wall and lifting the bow member pins from said sockets, and a tarpaulin cover mounted on said support and having its side margins lapping the side walls and at least one of its end margins lapping one of the end walls of the container body and having said margins secured to said respective lapped walls.

References Cited in the file of this patent

UNITED STATES PATENTS

| | | |
|---|---|---|
| 893,413 | Wood | July 14, 1908 |
| 951,089 | Cooper | Mar. 1, 1910 |
| 1,031,206 | Sowers | July 2, 1912 |
| 1,881,822 | McKelligon | Oct. 11, 1932 |
| 2,457,842 | Smith | Jan. 4, 1949 |
| 2,591,049 | Butsch | Apr. 1, 1952 |
| 2,613,836 | Newhall | Oct. 14, 1952 |
| 2,733,953 | Nenadal | Feb. 7, 1956 |
| 2,756,073 | Bridge | July 24, 1956 |
| 2,826,329 | Beckner | Mar. 11, 1958 |
| 2,969,284 | Ambli | Jan. 24, 1961 |